United States Patent

Eiler et al.

[15] 3,693,742
[45] Sept. 26, 1972

[54] VEHICLE TRANSMISSION

[72] Inventors: Peter Eiler, Langenfeld; Klaus Sprave, Kaarst, both of Germany

[73] Assignee: Leo Gottwald K.G., Dusseldorf, Germany

[22] Filed: July 22, 1970

[21] Appl. No.: 57,270

[30] Foreign Application Priority Data

July 25, 1969 Germany .........G 69 29 464.0

[52] U.S. Cl..................................180/23, 180/24.11
[51] Int. Cl..........................B62d 61/10, B60k 17/36
[58] Field of Search..180/23, 24, 24.08, 24.09, 24.11

[56] References Cited

UNITED STATES PATENTS

| | | |
|---|---|---|
| 1,607,919 | 11/1926 | Saives.....................180/24.11 |
| 2,206,752 | 7/1940 | Price .......................180/24.09 |
| 2,407,675 | 9/1946 | Morgan ...................180/24 X |
| 2,693,244 | 11/1954 | Rockwell et al. ........180/24.09 |

FOREIGN PATENTS OR APPLICATIONS 69,823    9/1941    Czechoslovakia......180/24.08

*Primary Examiner*—Kenneth H. Betts
*Attorney*—McGlew and Toren

[57] ABSTRACT

A vehicle having a front axle and tandem rear axles all of which are driven from a speed change gearbox through a common distributor gearbox which is mounted on one of the tandem axles.

6 Claims, 5 Drawing Figures

INVENTOR
PETER EILER
KLAUS SPRAVE
BY
McGlew & Toren
ATTORNEYS

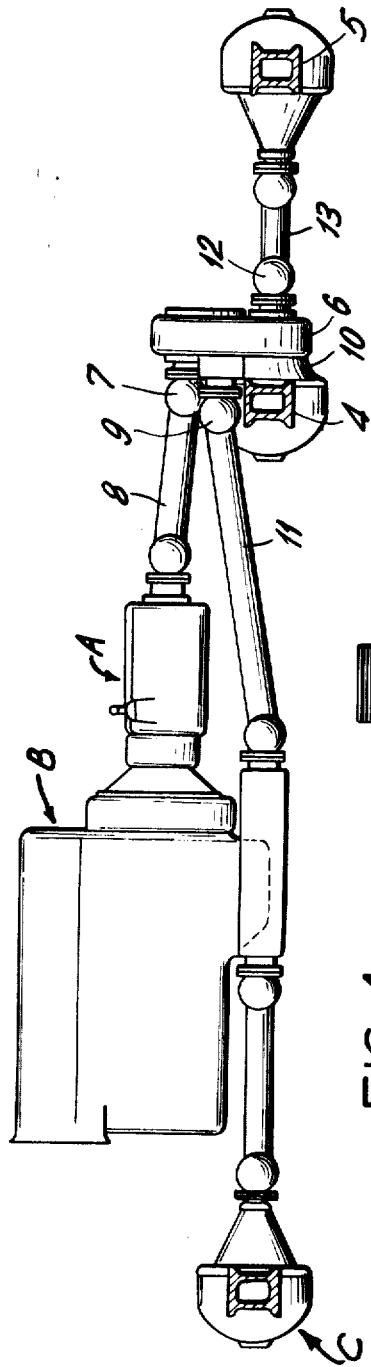
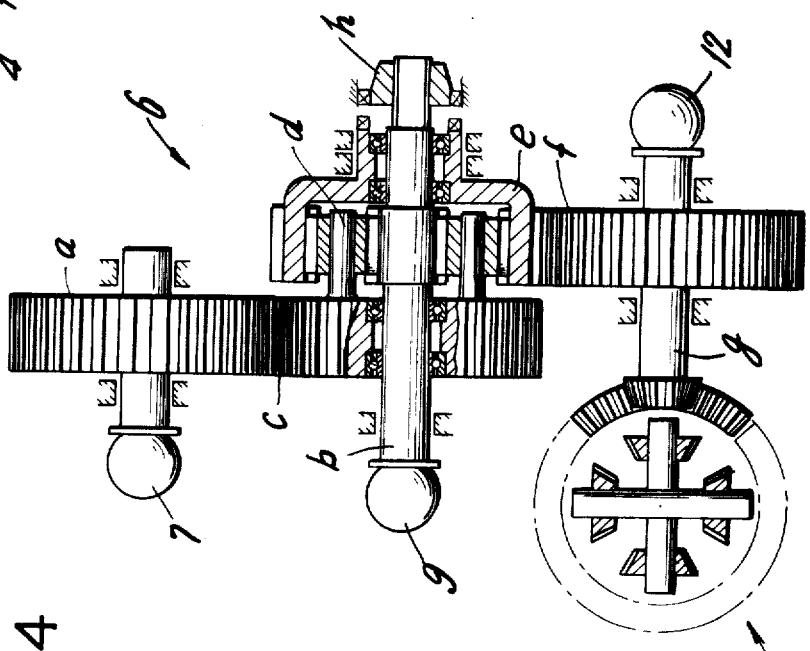
FIG.4
FIG.5

VEHICLE TRANSMISSION

This invention relates to transmissions for vehicles, such as particularly for heavy commercial vehicles and mobile cranes, which have tandem rear axles, with a speedchange gearbox and a distributor gearbox for transmitting drive from the speedchange gearbox to the front axle and to the tandem rear axles.

Vehicles of this kind often have tandem rear axles so as to minimize the load applied to each individual axle when the vehicle is supporting a heavy load. The arrangement of the drive system is extremely important. The drive from the motor is usually taken through a speedchange gearbox and then through a distributor gearbox which is attached to the speedchange gearbox to form a block unit. From the distributor gearbox the drive goes to the front axle and to the tandem rear axles. Between the distributor gearbox and the tandem axles there is a universally jointed shaft, and there is a second universally jointed shaft between the two axles forming the tandem set. This known drive system involves, for the tandem axles, the use of "superposed axles". The drive to the rear tandem axles is through an angle drive, a planetary drive and a carden shaft. This superposed drive system is costly to manufacture, takes up a great deal of space and makes it necessary to use a further gearing down before the drive reaches the axles.

The object of the present invention is to provide a transmission for vehicles of the kind described which does not suffer from the disadvantages mentioned above and in particular to provide a simple and compact transmission which does not involve the use of superposed axles.

In accordance with the invention, a vehicle has a front axle and tandem rear axles all of which are driven from a speedchange gearbox through a common distributor gearbox which is mounted on one of the tandem axles.

Preferably, the distributor gearbox is mounted on the rear of the front one of the tandem rear axles by means of a flanged connection.

A transmission arranged in this way allows frontally installed axles to be used. Consequently no further gearing down is required for the axles and the arrangement provides a very simple and easily installed transmission.

In a particularly favorable lay out, the distributor gearbox is driven by a first universally jointed shaft extending from the speedchange gearbox through the front face of the distributor gearbox; drives the rear one of the tandem rear axles by means of a second universally jointed shaft extending from the rear face of the distributor box, the front axle by means of a third universally jointed shaft extending from the front face of the distributor gearbox, and the front one of the tandem rear axles by means of a drive within a funnel-shaped housing which is mounted on the front one of the tandem rear axles by means of the flanged connection.

Preferably, then, the front end of the second shaft is situated substantially at the same height as the front one of the tandem rear axles, and the rear ends of the other two shafts are situated above the height of the front one of the tandem rear axles.

A very compact arrangement is obtained if the rear ends of the first and third shafts are situated on opposite sides of the vertical longitudinal plane containing the front end of the second shaft. This can give the distributor gearbox a cross section which has essentially the shape of an isosceles triangle.

If desired the distributor gearbox can be equipped with a differential to divide the torque between the front and rear axles. The differential is preferably arranged so that it can be locked, to give all the wheels positive traction in negotiating rough terrain.

An example of a vehicle constructed in accordance with the invention is illustrated in the accompanying drawings, in which:

FIG. 4 is a side elevation of the transmission of the vehicle; and

FIG. 5 is a view, partly in section, of the interior of the gearbox shown in FIGS. 1 to 4.

Figure 1:
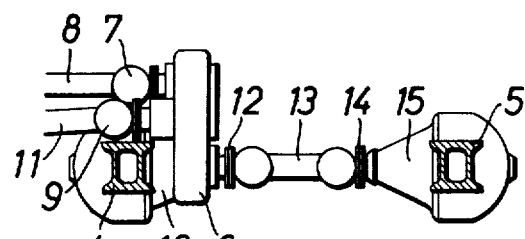
FIG. 1 is a side elevation of part of a transmission of the vehicle.
Figure 2:
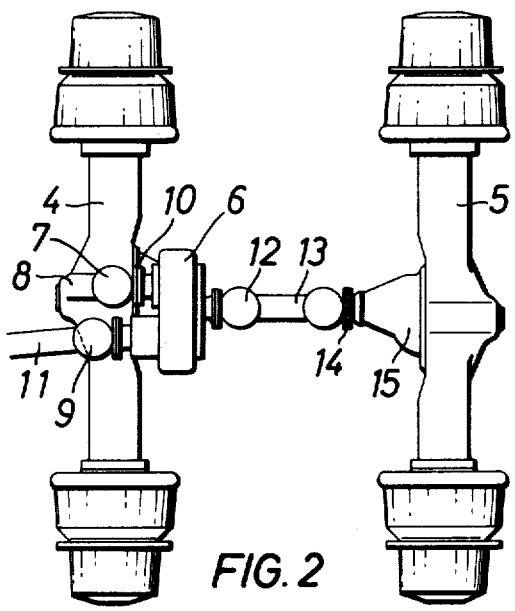
FIG. 2 is a corresponding plan.
Figure 3:
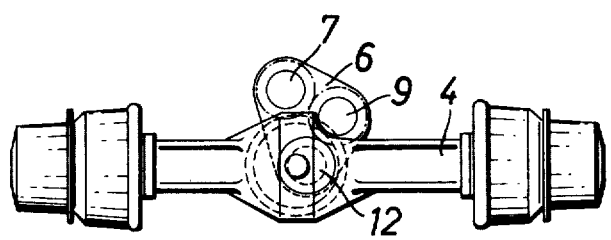
FIG. 3 is a corresponding front elevation.

FIGS. 1 and 3 show a tandem rear axle set for a heavy commercial vehicle, or a mobile crane, and consisting of a middle axle 4 and a rear axle 5. A distributor gearbox 6 is attached to the rear face of the middle axle 4 to form a block unit. The forward face of the distributor gearbox 6 has two universal joints, a first universal joint 7 for the driven shaft 8 from a speedchange gearbox A of the vehicle, see FIG. 4, and a second universal joint 9 for the final drive shaft 11 to the front axle C. The gearbox A is connected to the motor B of the vehicle. As will be seen from the drawing, the universal joint 9 is situated below and in front of the joint 7. The distributor gearbox 6 is attached to the rear face of the middle axle 4 by a flanged, funnel shaped housing 10 which contains the drive connection from the distributor box 6 to the middle axle 4.

The rear face of the distributor gearbox 6 has a third universal joint 12 for the final drive shaft 13 to the rear axle 5. The rear end of the final drive shaft 13 has a universal joint 14 at the forward end of a flanged, funnel shaped housing 15 mounted on the forward face of the rear axle 5.

As shown in particular in FIG. 3, the cross section of the distributor gearbox 6 is essentially triangular. This attachment of the distributor gearbox 6 to the rear face of the middle axle 4 allows the two axles 4 and 5 to accept drive through their forward and rear faces, and consequently the drive from the distributor gearbox 6 can be transmitted directly forwards through the flanged housing 10 to the middle axle 4, and directly rearwards through the final shaft 13 and through the flanged housing 15 to the rear axle 5. The arrangement also allows drive to be transmitted from the distributor gearbox 6 directly forwards through the joint 9 and the final drive shaft 11 to the front axle. In order to obtain a constant ratio between the power transmitted to the front axle and the power transmitted to the twin rear axles, the distributor gearbox 6 can contain a differential. The differential is arranged so that it can be locked so that all the axles of the vehicle are driven positively, that is to say without any differential effect, for example for negotiating bumpy ground.

For simplification of the illustration, only the universal joints 7,9 and 12 connected to the distributor gearbox 6 are shown in FIG. 5. The input drive is provided through the first universal joint 7 to the gear wheel $a$ within the gearbox 6. Gear wheel $a$ meshes with another gear wheel $c$. Gear wheel $c$ is rotatably mounted on a shaft $b$ which is associated with the second universal joint 9. The gear wheel $c$ drives the planetary wheels $d$ which, in turn, drive both the shaft $b$ and engage the cage $e$ which has teeth on both its interior and exterior surfaces. The cage $e$ meshes with the gear wheel $f$ which is secured on the shaft $g$. The shaft $g$ is associated with the third universal joint 12 and also with the middle axle 4. By means of the gear on shaft $b$, a ratio of moment of 1:2 is provided, accordingly, a larger moment is transmitted to the shaft $g$ due to the built-in planetary set than is transmitted to the shaft $b$.

The differential shown in FIG. 5 constitutes a known axle differential for equalizing the speed of rotation between the wheels on the axle. The lockability of the differential, mentioned above, is obtained by a sleeve $h$ secured on the opposite end of the shaft $b$ from the second universal point 9. The sleeve $h$ is axially movable and on its exterior it has a rectangularly shaped (four edge) toothing which can cooperate with a corresponding or complimentary toothing on the cage $e$ in the manner of a coupling with a spur gear. If, due to rough terrain, one set of wheels is turning while the others are not, the sleeve $h$ is moved in the leftward direction, as viewed in FIG. 5, until the two rectangularly shaped gears come into engagement with one another. As a result, a force-positive connection is provided between the cage $e$ and the shaft $b$ with the rotational moment of the gear $c$ being transmitted to all of the wheels so that the vehicle "grips".

The illustrated transmission is outstanding in particular by its structural simplicity and compactness. The mounting of the distributor gearbox on the rear face of the middle axle to form a block unit gives a considerably shorter construction than has hitherto been obtainable. In particular the arrangement makes it unnecessary to use any superposed drive boxes on the axles, as has been necessary hitherto, with the result that a particularly light and inexpensive drive system is obtained.

We claim:

1. In a vehicle having a front axle, tandem rear axles comprising a first rear axle and a second rear axle with said second rear axle more remote from said front axle then said first rear axle, and a speed change gear box from which all of said axles are driven, the improvement comprising a common distributor gear box transmitting drive from said speed change gear box to each of said axles, said distributor gear box having a first side directed toward said front axle and an oppositely directed second side, means for mounting said distributor gear box on said first rear axle, said mounting means comprises a flange connection between said distributor gear box and the side of said first rear axle which faces toward said second rear axle, a first universally jointed shaft extending from said speed change gear box through the first side of said distributor gear box for transmitting drive from said speed change gear box to said distributor gear box, a second universally jointed shaft extending from the second side of said distributor gear box to said second rear axle of said tandem rear axles for transmitting drive thereto, a third universally jointed shaft extending from said first side of said distributor gear box to said front axle for transmitting drive thereto, said flange connection includes a funnel-shaped housing extending between the side of said first rear axle which faces toward said second rear axle and said distributor gear box, and a drive connection located within said funnel-shaped housing extending from said distributor gear box to said first rear axle of said tandem rear axles.

2. A vehicle according to claim 1, wherein said distributor gearbox incorporates a differential.

3. A vehicle according to claim 2, wherein said differential is lockable.

4. A vehicle according to claim 1, wherein the end of said second shaft adjacent said distributor box is situated substantially at the same height as said first rear axle of said tandem rear axles, and the ends of said first and third shafts adjacent said distributor box are situated above the height of said first rear axle of said tandem rear axles.

5. A vehicle according to claim 4, wherein the ends of said first and third shafts adjacent said distributor box are situated on opposite sides of the vertical plane extending normally of said front and tandem rear axles and containing the end of said second shaft adjacent said distributor box.

6. A vehicle according to claim 5, wherein said distributor gear box has approximately the shape of an isosceles triangle in a vertical plane extending substantially parallel with the axes of said front and tandem rear axles.

* * * * *